Dec. 1, 1931.  J. MASZNI  1,834,494
HEADLIGHT DIMMER
Filed Dec. 14, 1929
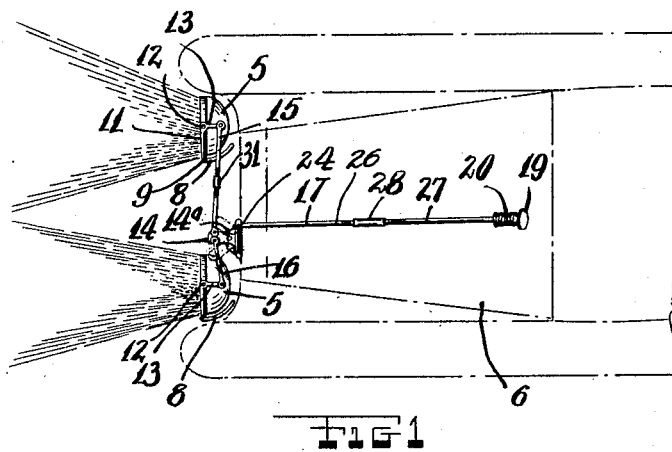
INVENTOR.
Joseph Maszni
BY Zoltan Holechek
ATTORNEY Patented Dec. 1, 1931

1,834,494

UNITED STATES PATENT OFFICE

JOSEPH MASZNI, OF NEW BRUNSWICK, NEW JERSEY

HEADLIGHT DIMMER

Application filed December 14, 1929. Serial No. 414,012.

This invention relates to headlight dimmers for automobiles, and has more particular reference to improvements in that type of dimming devices wherein manually operable means is provided to project or retract dimmer shades or hoods in front or from the front respectively, of the headlights at the left hand sides thereof, whereby the light rays from the headlights are effectively controlled so as to avoid blinding the driver of an approaching vehicle.

The primary object of the present invention is to provide a dimming device of the above kind which is extremely simple in construction, efficient in operation, and adapted for ready and convenient application to headlights of existing automobiles.

More particular objects are to provide improvements in the form, mounting and actuating mechanism of and for the dimmer shades or hoods.

Still another object is to provide actuating mechanism whereby the dimmer shades are normally retracted to an inoperative position and are adapted for projection by foot operation on the part of the driver or normally projected to an operative position and are adapted for retraction to an inoperative position by the same foot operation of the driver so as to leave both hands free for steering of the automobile.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a top plan view showing the headlights of an automobile equipped with a dimming device constructed in accordance with the present invention.

Fig. 2 is a side elevational view thereof.

Fig. 3 is an enlarged fragmentary front elevational view of the headlights and associated parts of the dimmer device.

Fig. 4 is a view similar to Fig. 1 with the dimmer shades projected.

Fig. 5 is an enlarged view of a portion of the illustration shown in Fig. 4.

Fig. 6 is an enlarged detailed view of a portion of Fig. 5.

Fig. 7 is a fragmentary view taken along the line 8—8 of Fig. 6.

Referring more in detail to the drawings, 5 indicates the conventional headlights mounted suitably at opposite sides and at the front of the automobile, indicated by dotted lines at 6 and having the front driver's seat as indicated at 7.

In accordance with the present invention, dimmer shades or hoods are mounted on the headlights 5 for horizontal swinging movement, being normally retracted to positions at corresponding sides of the headlights as shown in Fig. 1, and foot operated means being provided to project the dimmer shades in front of corresponding sides of the headlights as indicated in Fig. 1. As shown, each dimmer shade or hood consists of a vertical curved metallic plate 8 attached at its forward or leading edge as at 9 to a vertical rod 10 connecting the free ends of a pair of horizontally swinging arms 11, respectively pivoted at their other ends as at 12 to the top and bottom of the headlight casing at the front of the latter.

The arms 11 for the respective headlights normally project laterally toward and beyond the left side of said headlights as shown in Fig. 1 so that the dimmer shades 8 are normally retracted to position at the left hand sides of the headlights as is also shown in Fig. 1.

The upper arms 11 of the two dimmer shade mountings form corresponding arms of bell crank levers, the other arms 13 of which normally project rearwardly and are respectively connected with the longitudinal forwardly projecting arm of a T-lever 14 by means of connecting rods 15 and 16. The T-lever 14 is pivotally mounted at 14$^a$ upon the forward end of the automobile body intermediate the headlights as clearly shown in Figs. 1 and 3, the transverse arm of said T-lever 14 normally projecting laterally to the right and left and having the forward end of a push rod 17 pivotally connected thereto.

The push rod 17 is suitably extended rearwardly within the engine hood of the vehicle and is given such angular shape as shown in Fig. 2 to pass at its rear end upwardly through the foot board 18 in front of the driver's seat 7, where it has its terminal equipped with a suitable foot plate 19 for convenient actuation by the foot of the driver occupying the seat 7.

The dimmer shades are normally retracted with the parts positioned as in Fig. 1 by any suitable spring device, such as a helical compression spring 20 surrounding the rear end portion of the rod 17 between the foot plate 19 and the foot board 18 to normally pull rearwardly on the rod 17 in an obvious manner. The rod 17 will obviously be of quite rigid or stiff form so as to effectively resist flexing and insure actuation of the T-lever 14 when pressure is applied to the foot plate 19.

Moreover, the dimmer shades 8 are preferably provided with polished faces so that when they are projected, the light rays striking the right hand faces thereof will be projected to the right for effectively illuminating the right hand side of the roadway when the left hand sides of the headlights are dimmed to avoid blinding the eyes of the driver of an approaching vehicle.

The transverse arm of the T-lever 14 is formed with a slot 24 extending from end to end and to the right and to the left of the pivot point 14$^a$. A cap screw 25 is engaged thru each of the ends of the transverse arm and divides off a small portion of the transverse slot for holding the front end of the push rod 17 pivotally. If desired, the rod may be connected at one end of the slot by engagement by one of said cap screws or on the other end by engagement by the other of said cap screws.

The push rod 17 is formed of two sections namely a front push rod section 26 and a rear push rod section 27 adjustably connected by a connector 28. Preferably the adjacent ends of the push rod sections are formed with opposite hand threads and threadedly engage in the connector so that upon rotation of the latter element, the sections are drawn together or moved apart. The connecting rod 15 is also formed of two sections, namely a right hand connecting rod section 29 and a left hand connecting rod section 30 adjustably connected by a connector 31. The arrangement is similar to that of the push rod so that upon rotation of the connector in one direction the sections are drawn together, and in the other direction extended. The connecting rod 16 is also made of two sections namely a right hand connecting rod section 32 and a left hand connecting rod section 33 adjustably joined by a connector 34 similar to the arrangement of the connecting rod 15 so that upon rotation of the connector in one direction the connecting rod is lengthened, and in the other direction shortened. The adjustments of these connector rods 15 and 16 comprise a means to normally position the bell crank levers with their corresponding arms projecting in the same direction.

In operation, the dimmer shades may be normally retracted to an inoperative position at the left hand sides of the headlights as shown in Fig. 1, under which conditions the light rays may pass unrestricted for the usual illumination of the roadway ahead of the automobile. Upon the approach of an automobile traveling in the opposite direction, the driver will press the push rod 17 forwardly against the action of the spring 20 so as to swing the T-lever 14 from the position of Fig. 1 to the position of Fig. 4, thereby swinging the dimmer shades 8 forwardly and to the right until they occupy positions in front of the left hand sides of the headlights as shown in Fig. 4. In this way the rays are prevented from passing to the left and blinding the eyes of the driver of the approaching automobile, although sufficient illumination directly ahead and to the right is permitted to permit the driver to safely proceed. As soon as the approaching vehicle has passed, the foot pressure is removed from the plate 19 so that the spring 20 will pull the rod 17 rearwardly and return the dimmer shades to their normal inoperative positions of Fig. 1.

If desired the cap screw pivotally holding the push rod 17 in one of the ends of the transverse slot 24 may be removed and the push rod moved to the other end of the slot and pivotally supported there, by the other cap screw 25. In this condition when one steps upon the plate 19, the connecting rods 15 and 16 are moved to the right. According to the previous arrangement, they were moved to the left and served to move the dimmer shades 8 over the headlights.

The connectors 31 and 34 are adjusted so that in the normally extended position of the plate 19, the dimmer shades 8 extend over the left hand portions of the headlights to any desired amount. Now, upon depression of the plate 19 the connecting rods 15 and 16 move towards the right and pivot the dimmer shades so as to move free from the fronts of the headlights and allow the unrestricted passage of light. The connector 28 may be adjusted for controlling the position of the dimmer shades.

Many times it is desirable to normally cut off the beam of light from the headlights directly in front of the automobile and merely shine the lights towards the right hand side so that the driver may safely progress. This is particularly true on a very busy thoroughfare where the cars are continually coming from the front. In the event that the driver wishes to see directly in front of him, he merely steps upon the plate 19 for moving the shade dimmers off from their covering positions. Upon his release of the plate 19 the dimmers return to their operative restricting positions.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with the headlights of an automobile, bell crank levers pivoted on said headlights for horizontal swinging movement, means to normally position said levers with corresponding arms thereof projecting in the same direction and with their other arms projecting substantially rearwardly, vertical dimmer shades mounted on the outer ends of the first mentioned arms to swing therewith to positions in front and behind of corresponding sides of the headlights, a horizontally swinging T-lever pivotally mounted between the headlights, rods connecting said other arms of said bell crank levers with a longitudinal arm of said T-lever and arranged for longitudinal adjustments, and a foot operated push rod having its forward end adjustably attached to the transverse arm of said T-lever and arranged so that attachment at one end causes the dimmer shades to normally rest behind the headlights and operation of the push rod to advance the dimmer shades to cover a portion of the front of the headlights and so that attachment upon the other end causes the dimmer shades to normally rest covering a portion of the front of the headlights and operation of the push rod to retract the dimmer shades to a position behind the headlights, said transverse arm of the T-lever being formed with a slot extending to the right and to the left of its pivot point and means for pivotally holding said pusher rod in one or the other end of said slot.

2. In combination with the headlights of an automobile, bell crank levers pivoted on said headlights for horizontal swinging movement, means to normally position said levers with corresponding arms thereof projecting in the same direction and with their other arms projecting substantially rearwardly, vertical dimmer shades mounted on the outer ends of the first mentioned arms to swing therewith to positions in front and behind of corresponding sides of the headlights, a horizontally swinging T-lever pivotally mounted between the headlights, rods connecting said other arms of said bell crank levers with a longitudinal arm of said T-lever and arranged for longitudinal adjustments, and a foot operated push rod having its forward end adjustably attached to the transverse arm of said T-lever and arranged so that attachment at one end causes the dimmer shades to normally rest behind the headlights and operation of the push rod to advance the dimmer shades to cover a portion of the front of the headlights and so that attachment upon the other end causes the dimmer shades to normally rest covering a portion of the front of the headlights and operation of the push rod to retract the dimmer shades to a position behind the headlights, said transverse arm of the T-lever being formed with a slot extending to the right and to the left of its pivot point and means for pivotally holding said pusher rod in one or the other end of said slot, said latter means comprising cap screws threadedly engaged in the T-lever and dividing off the ends of the said transverse slot.

3. In combination with the headlights of an automobile, bell crank levers pivoted on said headlights for horizontal swinging movement, means to normally position said levers with corresponding arms thereof projecting in the same direction and with their other arms projecting substantially rearwardly, vertical dimmer shades mounted on the outer ends of the first mentioned arms to swing therewith to positions in front and behind of corresponding sides of the headlights, a horizontally swinging T-lever pivotally mounted between the headlights, rods connecting said other arms of said bell crank levers with a longitudinal arm of said T-lever and arranged for longitudinal adjustments, and a foot operated push rod having its forward end adjustably attached to the transverse arm of said T-lever and arranged so that attachment at one end causes the dimmer shades to normally rest behind the headlights and operation of the push rod to advance the dimmer shades to cover a portion of the front of the headlights and so that attachment upon the other end causes the dimmer shades to normally rest covering a portion of the front of the headlights and operation of the push rod to retract the dimmer shades to a position behind the headlights, said transverse arm of the T-lever being formed with a slot extending to the right and to the left of its pivot point and means for pivotally holding said pusher rod in one or the other end of said slot, said latter means comprising dividable means engaging in the slot of said T-lever and dividing off the ends of the said transverse slot into apertures engageable by the end of the said pusher rod.

In testimony whereof I have affixed my signature.

JOSEPH MASZNI.